United States Patent [19]
Schwarzenberger

[11] Patent Number: 6,128,054
[45] Date of Patent: Oct. 3, 2000

[54] APPARATUS FOR DISPLAYING AN IMAGE

[75] Inventor: Paul Schwarzenberger, London, United Kingdom

[73] Assignee: Central Research Laboratories Limited, Middlesex, United Kingdom

[21] Appl. No.: 08/922,596

[22] Filed: Sep. 3, 1997

[30] Foreign Application Priority Data

Sep. 6, 1996 [GB] United Kingdom ............... 9618593

[51] Int. Cl.$^7$ .................................................. G02F 1/133
[52] U.S. Cl. ............................................................ 349/73
[58] Field of Search .................................................. 349/73

[56] References Cited

U.S. PATENT DOCUMENTS 4,365,869 12/1982 Hareng et al. .
5,571,387 11/1996 Iigahama et al. ........................ 349/84

FOREIGN PATENT DOCUMENTS 0 650 295  4/1995  European Pat. Off. .

*Primary Examiner*—William L. Sikes
*Assistant Examiner*—James A Dudek
*Attorney, Agent, or Firm*—Evenson, McKeown, Edwards & Lenahan, P.L.L.C.

[57] ABSTRACT

An apparatus for displaying an image has a display area comprises a plurality of displays such as LCDs or CRTs each displaying a given part of the display area in a side by side arrangement facing in the same direction with gaps between them. A pair of arrays of converging lenses is provided in the path of light from the display area to the image. Each array comprises lenses having the same focal length, and lenses in respective arrays have different focal lengths. The arrays have different pitches and lie in parallel planes in an afocal arrangement. The arrays expand and/or laterally shift the given parts of the display area to form a viewable image of the whole display area in which the gaps between neighbouring parts of the image are less visible than the gaps between neighboring parts of the display area.

16 Claims, 4 Drawing Sheets

APPARATUS FOR DISPLAYING AN IMAGE

This invention relates to an apparatus for displaying an image, the apparatus having a display area comprising a plurality of display units each displaying a part of the display area in a side by side arrangement.

Displays made up from a number of smaller display units which resemble a mosaic pattern are known. Such displays suffer from a number of disadvantages including; variations in illumination intensity between units, and dark gaps between the individual display units due to the fact that the display area on each unit cannot extend right up to the edge of the unit.

A known apparatus of this general type is disclosed in WO 88/10052. In this apparatus a large screen video display system comprises a 3×3 array of cathode ray tubes or liquid crystal displays (LCDs). An optical plate comprising an array of lenticular lenses is positioned in front of the face plate of each visual display unit to magnify the video image and project them as a mosaic of images on the back face of a rear projection screen. Each lens in the array has to be tilted at a different angle to the plane of the array to displace the resultant images on the screen to give a magnified image. Digital techniques are used to divide the original video image into segments corresponding to each lens, and to invert each segment so that when the image is inverted by the simple lenticular lenses they appear the right way up on the rear projection screen.

This known apparatus has a number of disadvantages. Firstly, because the array of lenses all have to be tilted at different angles the manufacture of the lenticular optical plate is difficult and expensive. Secondly, because the images from each of the lenticular lenses making up the optical plate are inverted expensive digital signal processing electronics must be used to give a display which appears to be the right way up.

According to a the present invention there is provided an apparatus as specified in the claims. This can provide the advantage that the apparatus is simple and cheap to make, because the images produced by the pair of arrays of lenses are upright, so that image processing electronics is unnecessary.

Preferably, the optical axes of the lenses in the arrays all point in the same direction. This simplifies the construction of the arrays of lenses.

Embodiments of the invention will now be described, by way of example only, with reference to the accompanying drawings, in which.

Figure 4A:
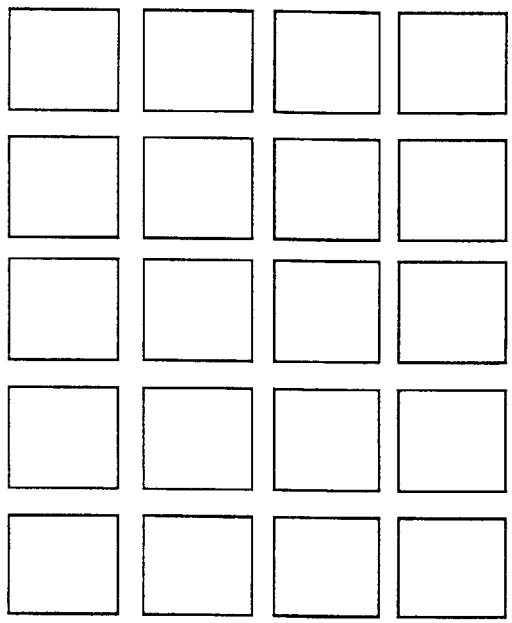
Figure 4B:
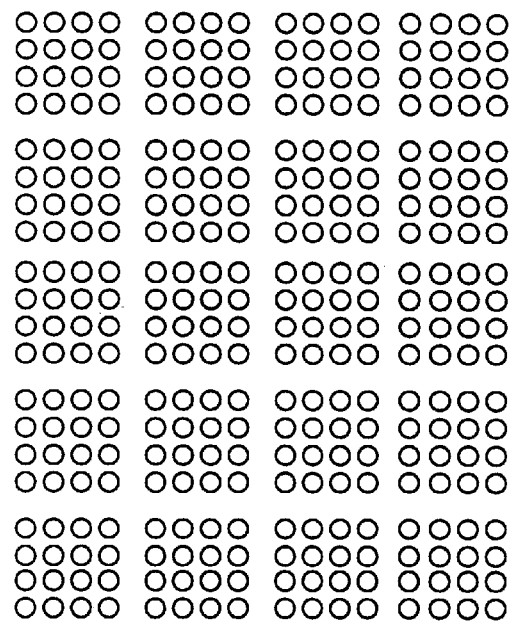
Figure 4C:
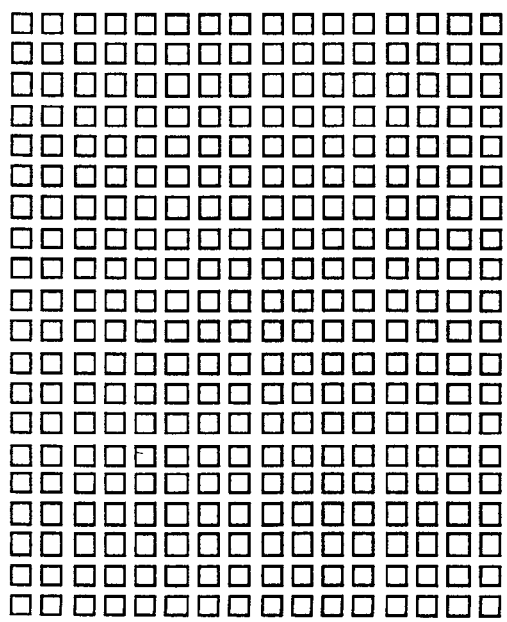

FIGS. 4a–c show a plan view of the elements of the first embodiment.

Figure 1:
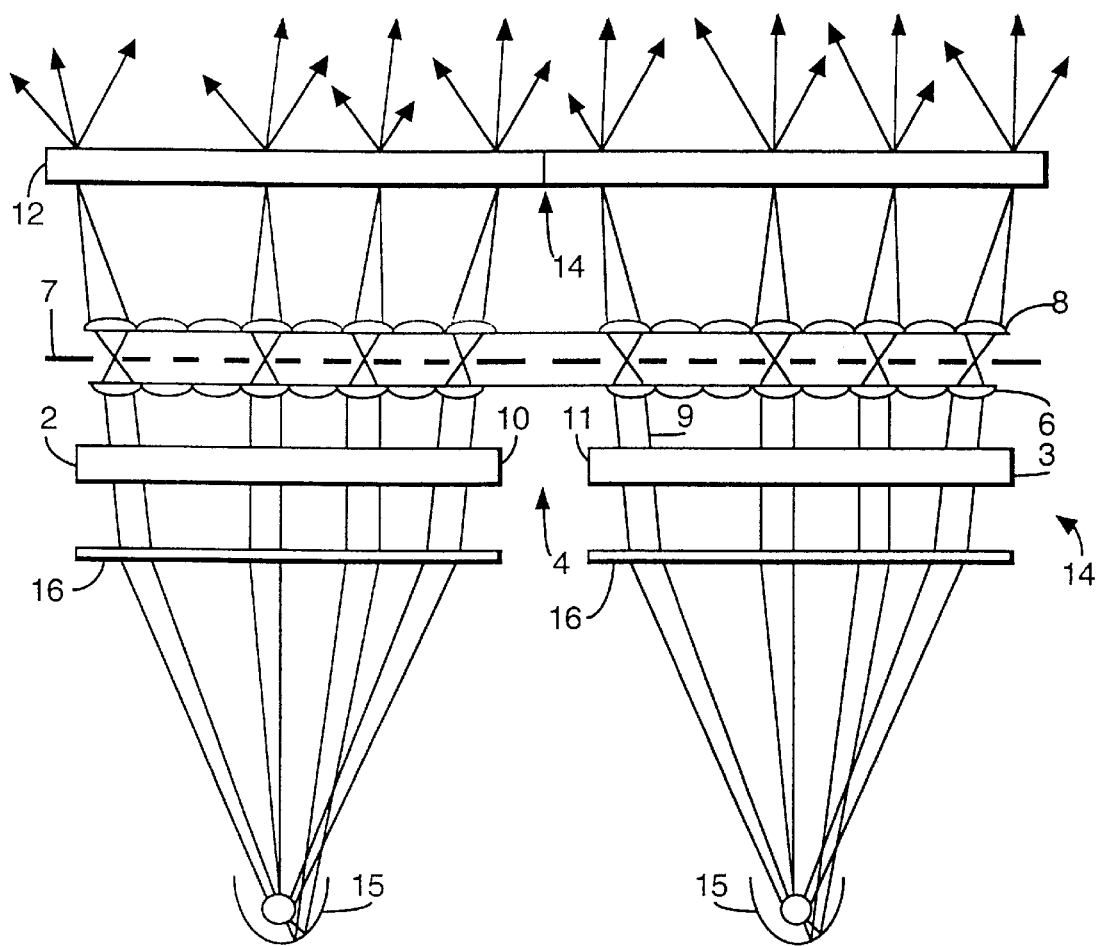
FIG. 1 shows a cross-section of a first embodiment of the invention.

FIG. 1 shows an apparatus for displaying an image having a display area (1) comprising a plurality of display units (2, 3) each displaying a part of the display area in a side by side arrangement facing in the same direction with gaps (4) between them, and magnifying means (6, 8) arranged in a path (9) of light from the display units. The magnifying means is arranged to form a viewable image (12) of the display area in which the gaps (14) between neighbouring parts of the display area are less visible. This is because the gaps between neighbouring parts of the image are smaller than the gaps between neighbouring parts of the display area.

In the embodiment shown in FIG. 1 the magnifying means comprises a pair of spaced microlens arrays (6, 8), the arrays in the present example comprising lenses having equal focal lengths in both arrays but different pitches. In the present example each display unit comprises a back-lit liquid crystal display panel having a rectangular image area measuring 246 mm by 184 mm. The lenses in the present example are lenticular.

Each array comprises microlenses having a focal length of approximately 4 mm and a lens sag height of 67.3 micrometers. Each array is carried on the major surface of a transparent glass substrate. The microlenses are close packed in a hexagonal arrangement, and are circular, having a diameter of 980 micrometers. The pitch of array 6 is 1.00 mm and the pitch of array 8 is 1.029 mm. A mask layer 7 is positioned between the two microlens arrays. It comprises an opaque sheet having openings or apertures the . The diameter of the apertures in the mask are 0.1 mm, and the pitch of the mask-apertures is 1,015 mm. The effective F-number of the arrangement is 4.1, and the optical system gives a linear magnification of 1.2. In the present example a diffusing Fresnel lens 16 has been provided between the light sources 15 and the LCDs (2, 3). This element is optional, and serves to make the apparatus more compact and provides a good viewing angle. In the present example all the lenses in both arrays have the same focal length. However, if desired the focal lengths of the lenses comprising different arrays can be different.

The separation of the various elements shown in FIG. 1 is as follows. The distance from the light source to the LCD panel is 150 mm, the distance from the LCD panel to the first microlens array (6) is 24 mm. The spacing between the microlens arrays is 9.5 mm, and the distance from the second microlens array to the rear projection screen 13 is 28 mm. The mask layer 7 is equidistant from the two microlens arrays.

The light sources (15) are preferably tungsten halogen lamps providing a luminous flux of approximately 3,000 lumen and having parabolic reflectors. However, any bright light source may be used as an alternative. The light source preferably has a divergent light beam, thereby improving the illumination efficiency of the apparatus. In the embodiment shown in FIG. 1 diffusive Fresnel lenses (16) are provided between the light sources 15 and the LCDs (2, 3).

The layouts of the various arrays in FIG. 1 are shown in the plan views of FIG. 4. FIG. 4a, 4b, and 4d illustrate the arrays 1,6, and 8 from FIG. 1 respectively; These plan views are all drawn to the same scale so that the relative spacings of the elements in each array can be easily seen.

In the embodiment shown in FIG. 1, neighbouring display units 2 and 3 have a gap 4 between them. On either side of this gap are edge portions 10 and 11 which are arranged to display the same part of the image. The magnifying means acts to expand the parts of the image from each display unit so that the image 12 appears to have no gaps. This is achieved by arranging the magnifying means such that the neighbouring edges of parts of the image from neighbouring display units coincide (i.e. adjacent parts of the image displayed by nearest neighbour display units share a common boundary) in the plane of the image when viewed by an observer.

The above apparatus overcomes the problem of visible gaps between the individual display units by expanding the image from each display unit to fill the viewing field using a "magnifying screen" which is superimposed upon the array of display units. This screen comprises in the above example two superimposed microlens sheets.

In a second embodiment of the invention (shown in FIG. 2) the arrays comprising sheets 6 and 8 in the first embodiment have been substituted by lens arrays such as for example double microlens arrays.

The use of a pair of parallel microlens arrays is described in Patent Number GB 541 753 filed by D Gabor in about 1940. The pair of microlens arrays, sometimes called Gabor superlenses, are in an a focal arrangement. Thus the arrays in each pair are separated by a distance equal to the sum of the focal lengths of each pair of lenses in the arrays. Such arrays are relatively easy to manufacture.

In this second embodiment, the microlenses are arranged in a plurality of arrays 6, 50, 51, 52 and 53. One array (6) constitutes a collimating means as before in which an array of microlenses 1 mm in diameter having focal lengths of 2 mm are placed 2 mm in front of the display units (2, 3). A first pair of microlens arrays (50, 51) comprise a first Gabor superlens in which the microlenses in one array have a different pitch to those in the other array. In the present case in order to expand the light beam the array nearest the display units (50) has the smaller pitch. The arrays 50 and 51 comprise microlenses having a diameter of 1 mm and equal focal lengths of 2.5 mm. The arrays 50 and 51 are separated from one another by 5 mm to give an a focal arrangement, and are spaced 1 mm from the collimating array 6. The second pair of microlens arrays 52 and 53 comprise microlenses 1 mm in diameter having equal focal lengths of 2.5 mm and placed in an a focal arrangement as before. However, in this case the pitches of the two arrays are larger than either of the arrays 50 or 51, and the array closest-to the display units (52) has a pitch larger than that of the other (53). Once again the pair of arrays 52, 53 forms a Gabor superlens. The two pairs of microlens arrays are spaced 10 mm apart from one another and facing one another.

Figure 2:
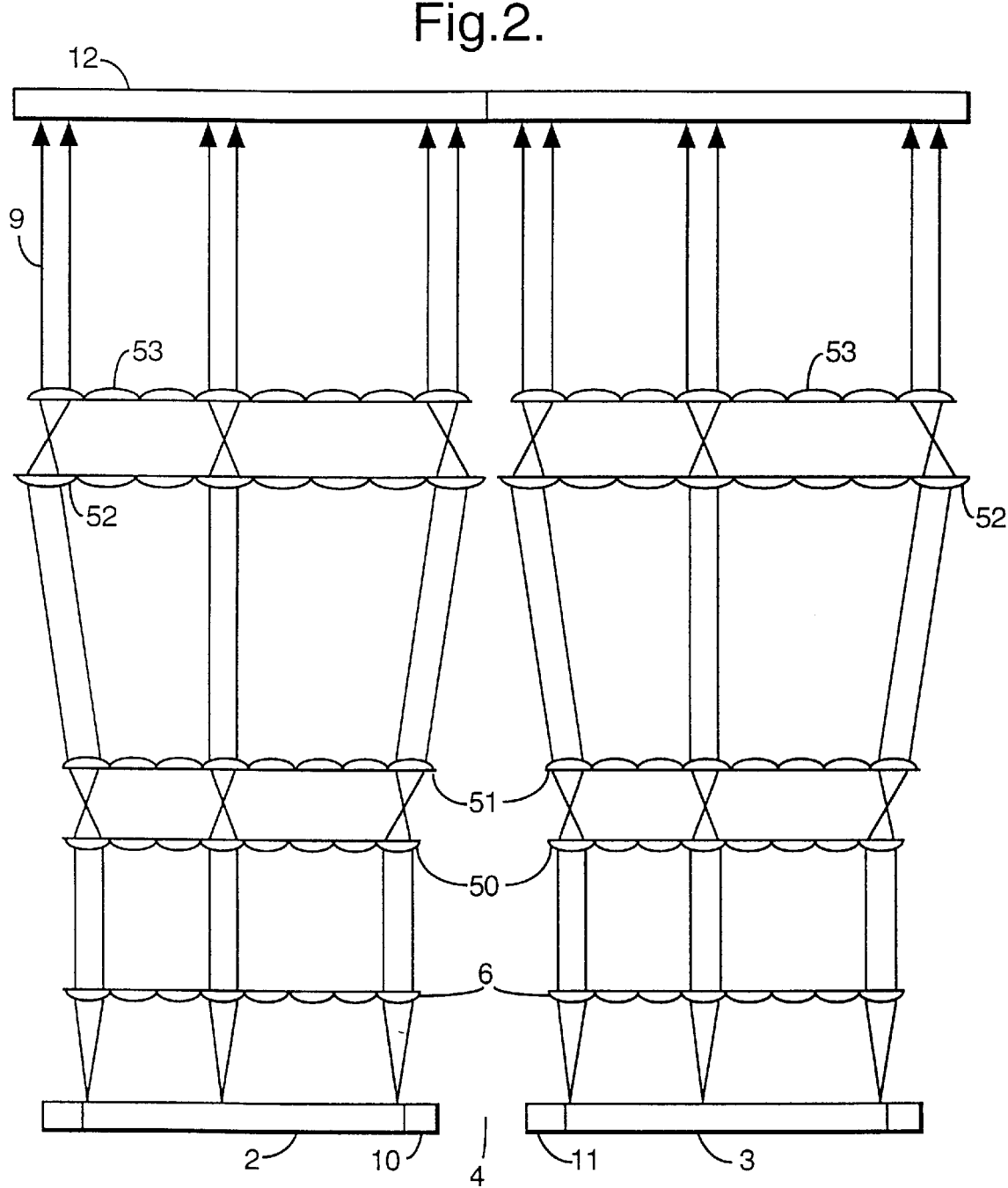
FIG. 2 shows a cross-section of a second embodiment.

The approach of expanding the image from each display unit can be used by itself to make the gaps between the parts of the image from neighbouring display units less visible, for example by using the embodiment of FIG. 2 but omitting the duplication of edge portions of the parts of the image displayed by adjacent display units. However, although there are no gaps between adjacent parts when viewing the image in a direction normal to the surface of the display units, an observer will observe discontinuities between the separate 'tiles' of the display when viewed at an oblique angle to the normal if such duplication is omitted. The discontinuities between adjacent parts of the image are not observed when viewing the whole display area when adjacent parts of the image are duplicated. This is because the far edge region of the closer of two neighbouring displays to an oblique viewpoint will not be transmitted by the microlens arrays or prism arrays because of geometrical effects. As an alternative, the microlens arrays may be substituted by prism arrays, formed for example from arrays of micro-prisms. Such prism arrays may be used to form a beam expansion telescope which performs in a similar way to one formed using converging lenses.

Figure 3:
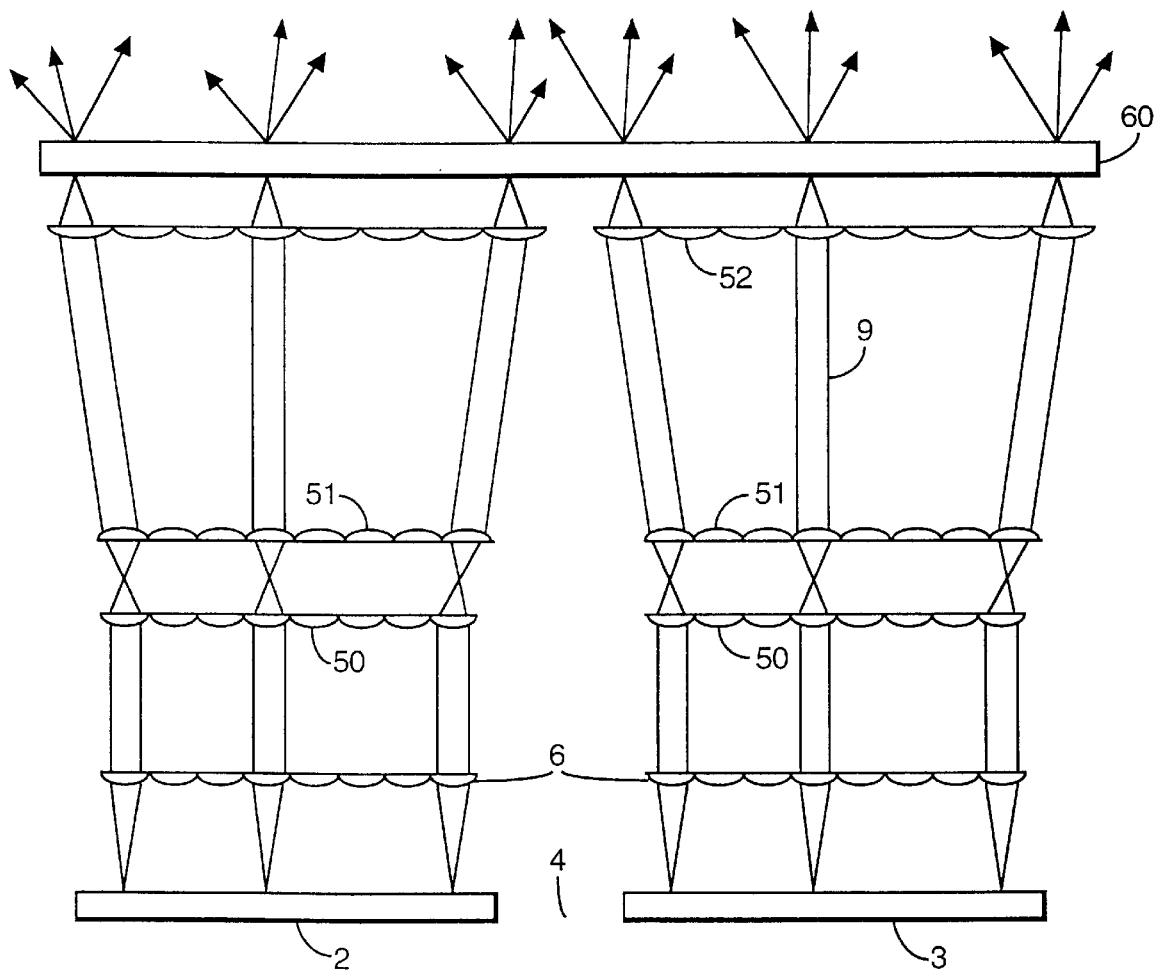
FIG. 3 shows a cross section of a further embodiment.

The problem of visible discontinuities can be overcome in either of two ways. Firstly, the edges of each image from individual display units may be duplicated as described above and shown in Figure 1. The idea of duplicating parts of each image on neighbouring display units is similar in concept to the duplication of areas at the edge of adjoining maps in a series covering a larger area than can be shown on a single map. Secondly, as an alternative to such duplication a screen which diffusely scatters incident light (such as for example a back projection screen or a translucent layer) may be placed in the plane of the image 12. An embodiment of the invention employing such a screen means 60 is shown in FIG. 3. If this approach is used it is not necessary to duplicate neighbouring edge portions of the display units and/or superimpose them. It will be noted that in the embodiment shown in FIG. 3 the magnifying means no longer requires the last array of microlenses (53) shown in the embodiment of FIG. 2.

It is of course possible to combine both of the above approaches, namely to provide a back projection type screen and to superimpose duplicate edge portions. In this arrangement it may be necessary to reduce the brightness of the duplicated portions from the edges of adjacent display units, so that when they are superimposed on the screen the-superimposed areas do not appear brighter. This can be achieved either with peripheral neutral density filters or modification to the displayed brightness in such areas.

Although the invention has been described above using LCDs as the display units, other display means such as for example gas plasma displays or cathode ray tubes may be used as an alternative.

In the special case where the magnifying power of the magnifying means is equal to unity, the parts of the display area are not so much expanded as laterally shifted such that the neighbouring edges of parts of the image from neighbouring display units coincide (i.e. adjacent parts of the image displayed by nearest neighbour display units share a common boundary) in the plane of the image when viewed by an observer.

Finally, the contents of the priority document for the present application (GB 9618593.9), particularly the drawings, are incorporated herein by reference.

What is claimed is:

1. An apparatus for displaying an image, including a display area (1), the apparatus comprising a plurality of display units (2, 3) each displaying a given part of the display area in a side by side arrangement facing in substantially the same direction with a gap (4) between adjacent parts, and magnifying means (6, 8) being arranged to expand and/or laterally shift the given parts of the display area to form a viewable image (12) of the whole display area in which the gaps between neighbouring parts of the image are less visible than the gaps between corresponding neighbouring parts of the display area, characterised in that the magnifying means includes or consists of two or more arrays of converging lenses (6, 8) in the path (9) of light from the display area to the image, each respective array comprising lenses having the same respective focal length, the arrays lying in substantially parallel planes and having different pitches.

2. An apparatus as claimed in claim 1 in which the optical axes of the lenses in the arrays all point in the same direction.

3. An apparatus as claimed in claim 1 in which the said converging lenses consist of microlenses.

4. An apparatus as claimed in claim 3 in which each array of lenses is carried by a major surface of a light transmissive sheet.

5. An apparatus as claimed in claim 1 in which the display units comprise liquid crystal displays.

6. An apparatus as claimed in claim 1 in which each display unit is lit by a light source (15) providing a divergent light beam.

7. An apparatus as claimed in claim 1 in which each display unit displays an array of pixels.

8. An apparatus as claimed in claim 1 in which a masking layer having opaque and light transmissive regions is positioned between the said arrays of lenses such that light passing through a given lens in the array closest to the display units passes through only one lens in another array.

9. An apparatus as claimed in claim 4 in which each array of lenses is carried by a respective light transmissive sheet which is secured to the other.

10. An apparatus as claimed in claim 1 in which the edge portion of the parts of the image, which, in use, is displayed by a nearest neighbour display unit, is duplicated on either side of the gap between said parts.

11. An apparatus as claimed in claim 1 in which corresponding parts of the image being displayed by neighbouring display units coincide.

12. An apparatus as claimed in claim 1 in which the apparatus includes a rear projection screen (60) for displaying the image in use.

13. An apparatus as claimed in claim 12 in which the magnifying means is adapted to superimpose duplicate edge portions of adjacent parts of the image from different display units onto said screen in use.

14. An apparatus as claimed in claim 1 in which the at least two arrays of lenses each comprise a pair of microlens arrays.

15. An apparatus as claimed in claim 14 in which each pair of microlens arrays comprises microlens arrays spaced in an a focal arrangement.

16. An apparatus as claimed in claim 1 in which the arrays of converging lenses are replaced by pairs of arrays of prisms.

* * * * *